United States Patent [19]

Chao

[11] Patent Number: 5,877,838
[45] Date of Patent: Mar. 2, 1999

[54] EYEGLASS APPLIANCE HAVING CLAMPING MEMBERS

[75] Inventor: David Yinkai Chao, Towson, Md.

[73] Assignee: Contour Optik Inc., Chiayi, Taiwan

[21] Appl. No.: 848,129

[22] Filed: Apr. 28, 1997

[51] Int. Cl.⁶ ........................................ G02C 9/00
[52] U.S. Cl. .............................. 351/47; 351/57
[58] Field of Search .................. 351/47, 48, 57, 351/58, 41, 44

[56] References Cited

U.S. PATENT DOCUMENTS

| 4,070,103 | 1/1978 | Meeker . | |
|---|---|---|---|
| 5,568,207 | 10/1996 | Chao | 351/57 |
| 5,642,177 | 6/1997 | Sunreeve . | |

FOREIGN PATENT DOCUMENTS

| 76209045 | 9/1976 | China . |
| 1061253 | 4/1954 | European Pat. Off. . |
| 85 07 761 U | 6/1985 | Germany . |
| 88 06 898 U | 10/1988 | Germany . |
| 2-109325 | 8/1990 | Japan . |
| 7-128620 | 5/1995 | Japan . |
| WO 90/09611 | 8/1990 | WIPO . |

OTHER PUBLICATIONS

Documents describing Twincome in a Patent Opposition Proceeding in Germany initiated by Pentax, on or around Apr. 30, 1997.

*Primary Examiner*—Hung Xuan Dang
*Attorney, Agent, or Firm*—Fliesler Dubb Meyer & Lovejoy LLP

[57] ABSTRACT

An eyeglass appliance includes a primary frame having two side studs for pivotally coupling two legs. An auxiliary frame for disposing in front of the primary frame includes two sides each having an extension for engaging over the stud and the leg. The extensions each includes a magnet for engaging with another magnet engaged in the leg or with the magnetic leg and for securing the auxiliary frame to the primary frame. The extensions each includes a clamping member for securing to the legs without the magnets.

5 Claims, 1 Drawing Sheet

EYEGLASS APPLIANCE HAVING CLAMPING MEMBERS

BACKGROUND OF THE INVENTION

1. Field of the Invention

The present invention relates to a pair of eyeglasses, and more particularly to a pair of eyeglasses having an auxiliary frame for supporting auxiliary lenses.

2. Description of the Prior Art

The closest prior art of which applicant is aware is U.S. Pat. No. 5,568,207 to Chao and has been assigned to the present assignee. The auxiliary frame may not be engaged with the legs.

The present invention has arisen to provide a novel configuration for securing the auxiliary frame to the primary frame.

SUMMARY OF THE INVENTION

The primary objective of the present invention is to provide an eyeglass appliance in which the legs of the primary frame each includes a magnet for engaging with a clamping member and/or a magnet of the auxiliary frame for solidly and stably securing the auxiliary frame to the primary frame.

In accordance with one aspect of the invention, there is provided an eyeglass appliance comprising a primary frame including two sides each having a stud, two legs pivotally coupled to the studs; an auxiliary frame for disposing in front of the primary frame, the auxiliary frame including two sides each having an extension for engaging over the stud and the leg, and means for securing the extensions to the legs and for securing the auxiliary frame to the primary frame.

The legs are made of magnetic material, the securing means includes two magnets engaged in the extensions for engaging with the legs and for securing the auxiliary frame to the primary frame.

The extensions each includes a free end portion for supporting the securing means, the securing means includes a pair of clamping members secured to the free ends of the extensions for clamping the legs and for securing the auxiliary frame to the primary frame.

The clamping members each includes two flaps extended downward for engaging with and for clamping the leg.

The clamping members each includes a biasing means for engaging with the legs and for securing to the legs.

The biasing means includes a spring member engaged in the clamping member and having at least one bulge for engaging with the leg and for securing to the leg.

The securing means includes two first magnets secured in the legs and includes two second magnets secured in the extensions for engaging with the first magnets and for securing the auxiliary frame to the primary frame.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
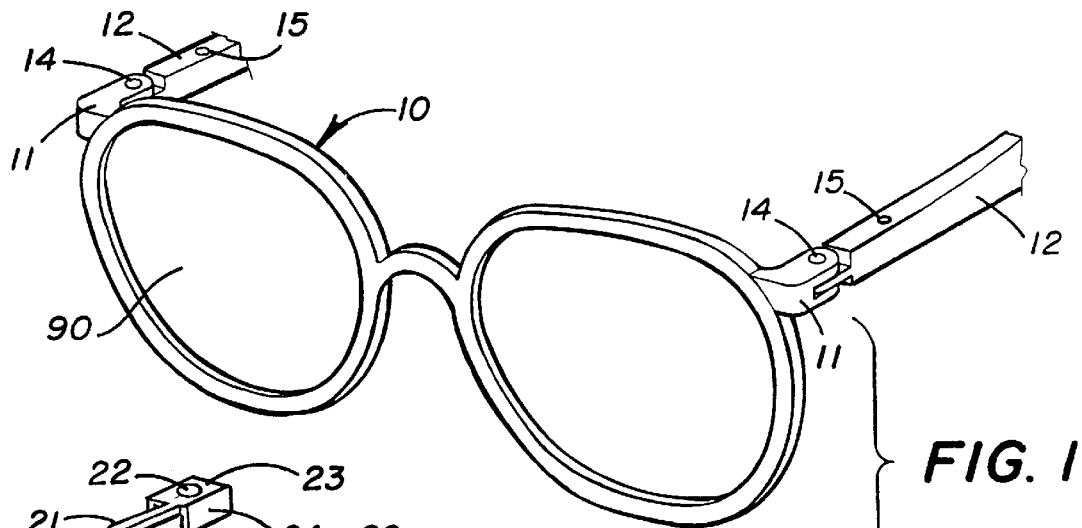
FIG. 1 is an exploded view of an eyeglass appliance having an auxiliary frame in accordance with the present invention.
Figure 2:
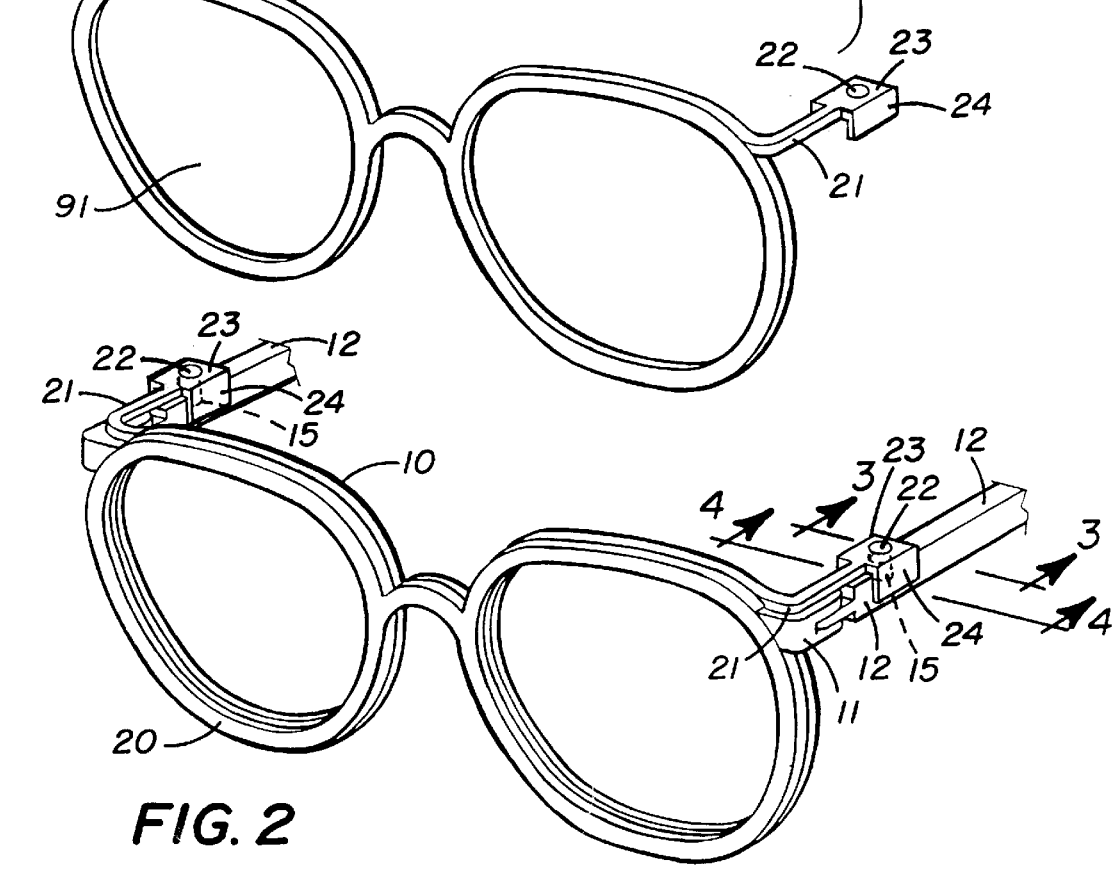
FIG. 2 is a perspective view of the eyeglass appliance.
Figure 3:
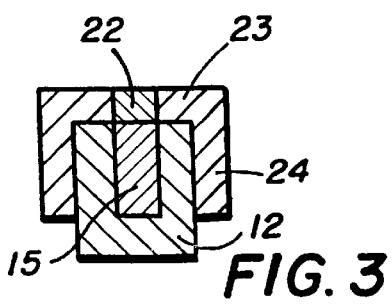
FIGS. 3 and 4 are cross sectional views taken along lines 3—3, 4—4 of FIG. 2 respectively.

Referring to the drawings, and initially to FIGS. 1–3, an eyeglass appliance in accordance with the present invention comprises a primary frame 10 for supporting primary lenses 90 and including two studs 11 formed in the side portions. Two legs 12 each is pivotally coupled to the studs 11 at a pivot shaft 14 and each includes a magnet 15 secured close to the pivot shaft 14. The magnets 15 are preferably facing upward. An auxiliary frame 20 for supporting auxiliary lenses 91 and for disposing in front of the primary frame includes two extensions 21 extended rearward from the side portions for engaging over the studs 11 of the primary frame 10 respectively. The extensions 21 each includes a magnet 22 for engaging with the magnet 15 of the stud 11 and for securing the auxiliary frame 20 to the primary frame 10.

It is preferable that the extensions 21 each includes a clamping member 23 provided in the free end portion and having a pair of downward dependent flaps 24 for resiliently engaging with the side portions of the leg 12 and for further stably securing the auxiliary frame 20 to the primary frame 10.

Alternatively, when the legs 12 are made of magnetic material, such as metal, the magnets 22 may also engage with the legs 12 for securing the auxiliary frame to the primary frame without the magnets 15.

Alternatively, without the magnets 22, 15, the flaps 24 of the clamping members 23 of the extensions 21 may solidly engage with the legs 12 for solidly securing the auxiliary frame to the primary frame without the magnets 15.

Figure 4:
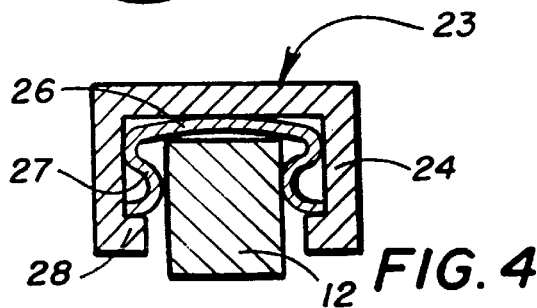

As shown in FIG. 4, it is preferable that the clamping members 23 each further includes a spring member 26 having one or more bulges 27 for engaging with and for biasing against the leg 12 and for further solidly securing to the leg 12. The flaps 24 each includes a flange 28 extended radially inward for engaging with the spring member 26 and for preventing the spring member 26 from disengaging from the clamping member 23.

Accordingly, the eyeglass appliance in accordance with the present invention includes a primary frame having two magnets secured in the legs for engaging with the magnets of the auxiliary frame and for solidly and stably securing the auxiliary frame to the primary frame. The extensions of the auxiliary frame may each include a clamping member for solidly securing the auxiliary frame to the primary without the magnets.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An eyeglass appliance comprising:
   a primary frame including two sides each having a stud, two legs pivotally coupled to said studs,
   an auxiliary frame for disposing in front of said primary frame, said auxiliary frame including two sides each having an extension for engaging over said stud and said leg, said extensions each including a free end portion, and
   a pair of clamping members, each secured to said free end of one of said extensions for clamping one of said legs and for securing said auxiliary frame to said primary frame.

2. An eyeglass appliance according to claim 1, wherein said clamping members each includes two flaps extended downward for engaging with and for clamping said leg.

3. An eyeglass appliance according to claim 1, wherein said clamping members each includes a biasing means for engaging with said legs and for securing to said legs.

4. An eyeglass appliance according to claim 3, wherein said biasing means includes a spring member engaged in said clamping member and having at least one bulge for engaging with said leg and for securing to said leg.

5. An eyeglass appliance according to claim 1 further comprising two first magnets secured in said legs and two second magnets secured in said extensions for engaging with said first magnets and for securing said auxiliary frame to said primary frame.

\* \* \* \* \*